United States Patent
Zhou et al.

(10) Patent No.: US 10,430,827 B2
(45) Date of Patent: Oct. 1, 2019

(54) MAINTAINING INFORMATION DESCRIBING A GROUP OF ONLINE SYSTEM USERS SPECIFIED BY A THIRD-PARTY SYSTEM

(71) Applicant: Facebook, Inc., Menlo Park, CA (US)

(72) Inventors: Li Zhou, Campbell, CA (US); Ian K. Abernathy, Austin, TX (US); Yunzhi Gao, Menlo Park, CA (US); Kosin Sutthimala, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 408 days.

(21) Appl. No.: 14/461,361

(22) Filed: Aug. 15, 2014

(65) Prior Publication Data
US 2016/0048881 A1    Feb. 18, 2016

(51) Int. Cl.
*G06Q 30/02* (2012.01)
*H04L 29/08* (2006.01)
*G06Q 50/00* (2012.01)

(52) U.S. Cl.
CPC ..... *G06Q 30/0247* (2013.01); *G06Q 30/0269* (2013.01); *G06Q 30/0277* (2013.01); *G06Q 50/01* (2013.01); *H04L 67/20* (2013.01); *H04L 67/306* (2013.01)

(58) Field of Classification Search
CPC ................ G06Q 30/0202; G06Q 30/0247
See application file for complete search history.

(56) References Cited

U.S. PATENT DOCUMENTS

| | | | |
|---|---|---|---|
| 8,762,193 B2* | 6/2014 | Maga | G06Q 10/06375 705/7.31 |
| 2007/0112615 A1* | 5/2007 | Maga | G06Q 10/0637 705/7.34 |
| 2011/0153412 A1* | 6/2011 | Novikov | G06Q 30/02 705/14.42 |
| 2011/0153421 A1 | 6/2011 | Novikov et al. | |

(Continued)

OTHER PUBLICATIONS

"Finally, A Social Media Marketing Strategy That Puts You Right In The Middle Of Your Target Market", by Tommy Walker. Published: Jun. 17, 2014. pp. 32-35. (Year: 2014).*

(Continued)

*Primary Examiner* — William A Brandenburg
(74) *Attorney, Agent, or Firm* — Fenwick & West LLP (57) ABSTRACT

An online system receives information describing a target group of online system users from a third party system and determines whether to store the information describing the target group. Online system users included in the target group are identified and scores are determined for each of the identified user. A score associated with a user represents the online system's effectiveness in targeting content to the user via targeting criteria maintained by the online system. Based on the scores, the online system determines a group score associated with the target group and stores the information describing the target group if the group score satisfies one or more criteria. If the information describing the target group is stored, the online system may determine whether to continue storing the information describing the target group based on revenue obtained by the online system from presenting content based on the target group.

15 Claims, 2 Drawing Sheets

(56) References Cited

U.S. PATENT DOCUMENTS

| | | | | |
|---|---|---|---|---|
| 2012/0116868 | A1* | 5/2012 | Chin .................. | G06Q 30/0203 |
| | | | | 705/14.43 |
| 2013/0110641 | A1* | 5/2013 | Ormont .............. | G06Q 30/0251 |
| | | | | 705/14.66 |
| 2014/0156385 | A1* | 6/2014 | Smallwood ........ | G06Q 30/0245 |
| | | | | 705/14.44 |
| 2014/0214545 | A1* | 7/2014 | Zhang ................ | G06Q 30/0277 |
| | | | | 705/14.64 |
| 2015/0134401 | A1* | 5/2015 | Heuer ................ | G06Q 30/0202 |
| | | | | 705/7.29 |
| 2015/0220939 | A1* | 8/2015 | Tay .................... | G06Q 30/0201 |
| | | | | 705/7.29 |
| 2016/0019595 | A1* | 1/2016 | Wu .................... | G06Q 30/0269 |
| | | | | 705/14.66 |

OTHER PUBLICATIONS

United States Office Action, U.S. Appl. No. 14/586,673, dated Oct. 24, 2017, twenty pages.

United States Office Action, U.S. Appl. No. 14/586,673, dated Dec. 19, 2018, fourteen pages.

Batrinca, B. et al., "Social media analytics: a survey of techniques, tools and platforms,", *AI & Society*, Feb. 2015, pp. 89-116, vol. 30, Issue 1. [Online] [Retrieved Mar. 28, 2019] Retrieved from the Internet <URL:https://link.springer.com/article/10 .1007/s00146-014-0549-4.>.

Trottier, D., "The business of conversations: Market social media surveillance and visibility," *First Monday Peer-Reviewed Journal on the Internet*, Feb. 4, 2013 vol. 18, No. 2. [Online] [Retrieved Mar. 28, 2019] Retrieved from the Internet <URL:https://journals.uic.edu/ojs/index.php/fm/article/view/3930/3413.>.

* cited by examiner

MAINTAINING INFORMATION DESCRIBING A GROUP OF ONLINE SYSTEM USERS SPECIFIED BY A THIRD-PARTY SYSTEM

BACKGROUND

This disclosure relates generally to identifying users of an online system, and more particularly to maintaining information describing groups of online system users specified by a third party system.

An online system allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

But as the amount of content provided by the online system increases, users may be presented with an increasing amount of content in which the users have little interest. To provide users with content more likely to be relevant, content items may be associated with targeting criteria specifying characteristics of users eligible to be presented with the content item. This limits presentation of a content item to users having characteristics satisfying the targeting criteria.

While the online system maintains targeting criteria for identifying groups of users satisfying various targeting criteria, a third party system may provide information to the online system identifying groups of online system users. Conventional online systems merely store information from third party systems identifying groups of users, allowing a third party system to identify a group of users to receive content. However, groups identified by a third party system may be duplicative of groups the online system may identify based on locally-maintained targeting criteria, limiting the usefulness to the online system of storing information identifying the group.

SUMMARY

An online system receives information from a third party system describing a target group that includes multiple users of the online system. Identifying a target group allows the third party system to specify a customized group of online system users to receive content. Information describing the target group may identify specific users of the online system or may include information specifying one or more characteristics of users of the online system in the target group. The online system determines whether to store the information describing the target group by determining scores associated with users of the online system identified as included in the target group and determining a group score associated with the target group form the determined scores. A score associated with a user included in the target group provides a measure of the efficiency with which targeting criteria maintained by the online system identify content eligible for presentation to the user. In some embodiments, the score associated with a user is based at least in part on a number of groups that are associated with targeting criteria and that include the user. For example, a number of groups that are associated with the targeting criteria and that include the user is determined, as well as a number of groups associated with the targeting criteria and including the user is determined and incremented by the targeting group, with a score associated with the user determined based at least in part on ten number of groups and the incremented number of groups.

Based on the score associated with users included in the target group, the online system determines a group score associated with the target group. In one embodiment, the group score is determined based on an average of the scores associated with users included in the target group. Additionally, a total of the scores associated with users included in the target group may also be used when determining the group score associated with the target group. In various embodiments, the group score associated with the target group is higher if the target group includes a large number of users or if the target group increases the ability of the online system to target content items to users included in the target group.

The online system determines whether the group score satisfies one or more criteria and stores information describing the target group if the group score satisfies at least a threshold number of the criteria. For example, the online system stores information describing the target group if the group score equals or exceeds a threshold value. Hence, the online system stores information describing target groups that are likely to increase the ability of the online system to target groups of users. After storing information describing the target group, the online system may determine a monetization value associated with the target group and determine whether to continue storing the information describing the target group based on the monetization value. In various embodiments, the monetization value is determined from an amount of revenue received by the online system from content items presented to users in the target group. If the monetization value is less than a threshold amount, the information describing the target group is removed by the online system.

In other embodiments, the online system determines an accuracy score associated with the target group and uses the accuracy score to determine whether to continue storing information describing the target group. For example, the online system presents one or more questions to users included in the target group to determine whether users included in the target group indicate they have characteristics associated with the target group. The questions may be presented to users included in the target group before the online system uses the target group to select content using the target group. If the accuracy score is less than a threshold value, the online system may remove the information describing the target group.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
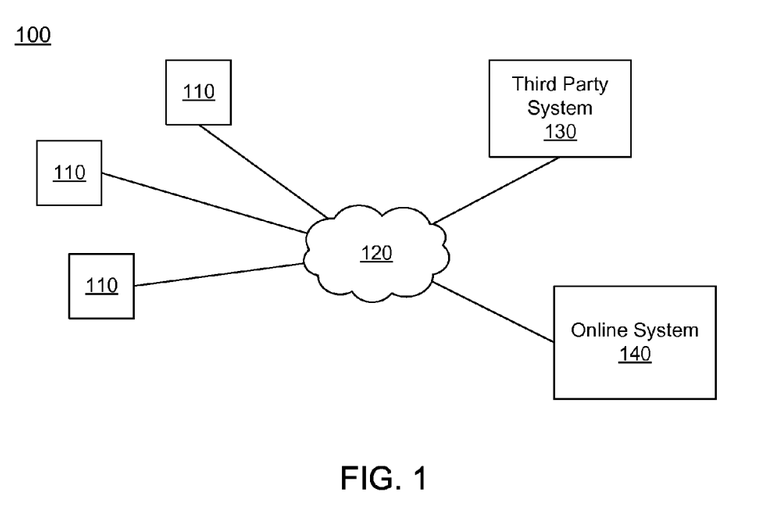
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, information describing a group of users of the online system 140, or information about an application provided by the third party system 130. In some embodiments, a third party system 130 may communicate information directly to the online system 140.

Figure 2:
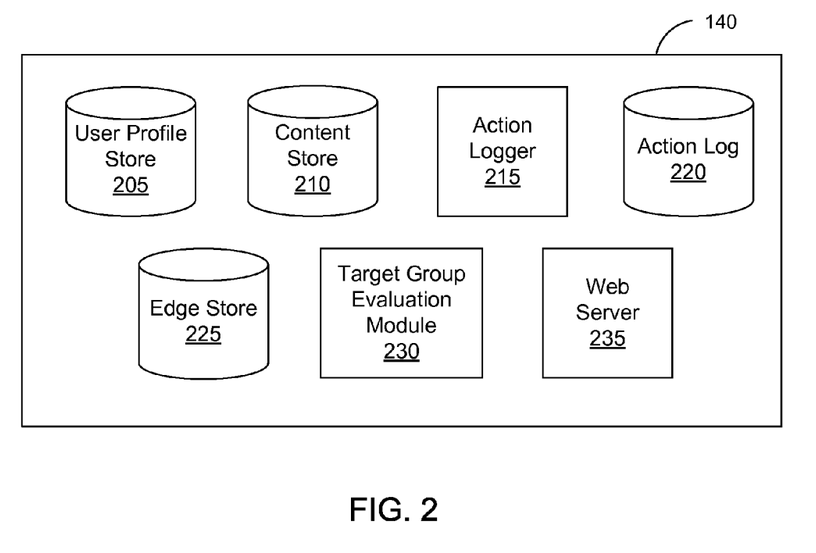
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, a target group evaluation module 230 and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220. In some embodiments, a third party system 130 may indirectly retrieve information from the user profile store 205, subject to one or more privacy settings associated with a user profile by a user, to identify a user profile in the user profile store 205 associated with a user of the third party system 130.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The target group evaluation module 230 receives information from a third party system 130 describing a target group that includes multiple users of the online system 140, allowing the third party system 130 to identify a target group including various online system users to the online system 140. Information describing the target group may identify specific users of the online system 140 or may include information specifying one or more characteristics of users of the online system 140 in the target group. The target group evaluation module 230 determines whether to store the information describing the target group by determining scores associated with users of the online system 140 identified as included in the target group and determining a group score associated with the target group form the determined scores. A score associated with a user included in the target group provides a measure of the efficiency with which targeting criteria maintained by the online system 140 identify content eligible for presentation to the user. In some embodiments, the score associated with a user is based at least in part on a number of groups that are associated with targeting criteria and that include the user. For example, a number of groups that are associated with the targeting criteria and that include the user is determined, as well as a number of groups associated with the targeting criteria and including the user is determined and incremented by the targeting group, with a score associated with the user determined based at least in part on ten number of groups and the incremented number of groups. Determining scores associated with users included in a target group is further described below in conjunction with FIG. 3.

Based on the score associated with users included in the target group, the target group evaluation module 230 determines a group score associated with the target group. In one embodiment, the group score is determined based on an average of the scores associated with users included in the target group. Additionally, a total of the scores associated with users included in the target group may also be used when determining the group score associated with the target group. In various embodiments, the group score associated with the target group is higher if the target group includes a large number of users or if the target group increases the ability of the online system 140 to target content items to users included in the target group. Determining a group score associated with a target group is further described below in conjunction with FIG. 3.

The target group evaluation module 230 determines whether the group score satisfies one or more criteria and stores information describing the target group if the group score satisfies at least a threshold number of the criteria. For example, the target group evaluation module 230 stores information describing the target group if the group score equals or exceeds a threshold value. Hence, the target group evaluation module 230 stores information describing target groups that are likely to increase the ability of the online system 140 to target groups of users. After storing information describing the target group, the target group evaluation module 230 may determine a monetization value associated with the target group and determine whether to continue storing the information describing the target group based on the monetization value. In various embodiments, the monetization value is determined from an amount of revenue received by the online system 140 from content items presented to users in the target group. If the monetization value is less than a threshold amount, the information describing the target group is removed by the target group evaluation module 230, as further described below in conjunction with FIG. 3. The target group evaluation module 230 may determine an accuracy score associated with the target group and uses the accuracy score to determine whether to continue storing information describing the target group. For example, the target group evaluation module 230 communicates one or more questions (e.g., surveys) to client devices 110 associated with users included in the target group to determine whether users included in the target group indicate they have characteristics associated with the target group. In one embodiment, higher accuracy scores indicate that users in the target group indicate via responses to the one or more questions that they have characteristics associated with the target group. If the accuracy score is less than a threshold value, the target group evaluation module 230 may remove the information describing the target group.

The web server 235 links the online system 140 via the network 120 to the one or more client devices 110, as well as to the one or more third party systems 130. In some embodiments, the web server 235 links the online system 140 directly ton one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Maintaining User Groups Specified by a Third-Party System

Figure 3:
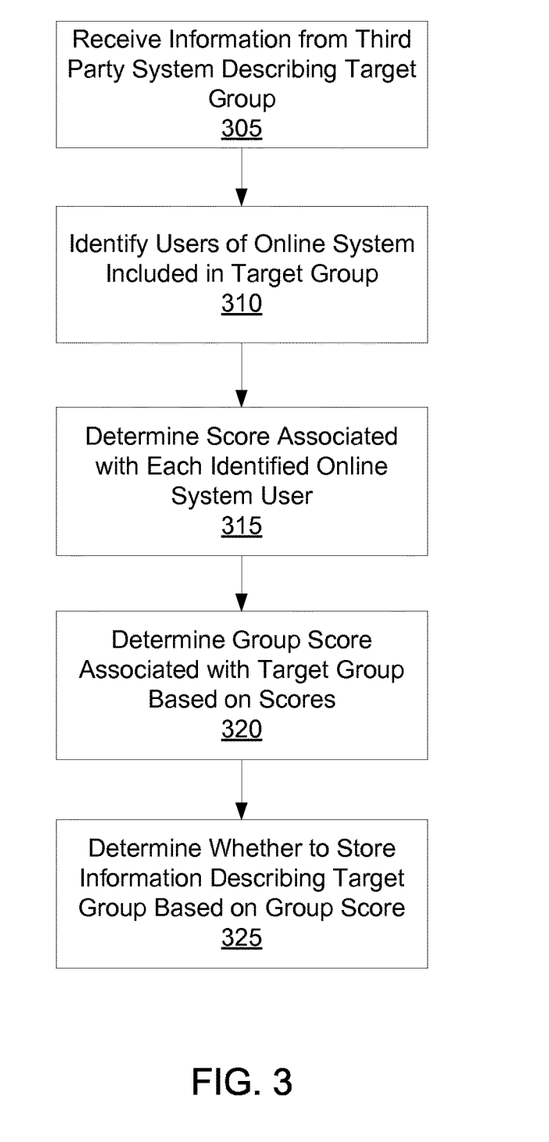
FIG. 3 is a flow chart of a method for maintaining groups of online system users specified by a third party system in an online system, in accordance with an embodiment.

FIG. 3 is a flow chart of a method for maintaining a group of users provided by a third party system 130 in an online system 140. In other embodiments, the method may include different and/or additional steps than those described in conjunction with FIG. 3. Additionally, in some embodiments, the method may perform the steps described in conjunction with FIG. 3 in different orders.

The online system 140 receives 305 information from a third party system 130 that describes a target group that includes multiple users of the online system 140. In one embodiment, the online system 140 receives 305 a target group identifier associated with the target group and user identifying information associated with users of the online system 140 included in the group. For example, the target group identifier is associated with email addresses, online system user identifiers, or any other type of information capable of identifying individual users of the online system 140. As another example, the online system 140 receives 305 a target group identifier associated with one or more characteristics of online system users from the third party system 140; in this example, the target group includes online system users having at least a threshold number of the characteristics.

Based on the received information, the online system 140 identifies 310 each user of the online system 140 included in the target group. If the information received 305 from the third party system 130 includes user identifying information, the online system 140 identifies 310 online system users associated with the user identifying information. If the information received 305 from the third party system 130 includes one or more characteristics and specifies a threshold number of characteristics, the online system 140 identifies 310 users associated with information maintained by the online system 140 satisfying at least the threshold number of characteristics. For example, the information received 305 from the third party system 130 includes the following 4 characteristics associated with users of the online system 140: a user is male, the user is connected to at least 50 other users of the online system, the user is at least 25 years old, and the user is within a threshold distance of a location. The received information also specifies a threshold number of 2 characteristics. The online system 140 identifies 310 users associated with information satisfying at least 2 out of the 4 characteristics included in the information received 305 from the third party system 130. Information associated with users by the online system 140 is associated with one or more targeting criteria, which the online system uses to identify content items eligible for presentation to the user. Users associated with characteristics satisfying at least a threshold number of targeting criteria associated with a content item are determined to be eligible to be presented with the content item. In some embodiments, the online system 140 maintains information describing groups associated with various targeting criteria, with each group associated with one or more targeting criteria and including information identifying users satisfying the one or more targeting criteria associated with the group.

For each identified user included in the target group, the online system 140 determines 315 a score associated with a user that provides a measure of the efficiency with which targeting criteria maintained by the online system 140 identify content eligible for presentation to the user. However, in some embodiments, a score is determined 315 for a subset of users identified 310 as included in the target group. In some embodiments, the score associated with a user is based at least in part on a number of groups that are associated with targeting criteria and that include the user. For example, a number of groups that are associated with the targeting criteria and that include the user is determined, as well as a number of groups associated with the targeting criteria and including the user is determined and incremented by the targeting group. The score associated with an identified user is determined 315 based at least in part on a difference between the number of groups associated with the targeting criteria and including the user and the number of groups including the user incremented by the target group. For example, the score associated with a user is a difference between a fourth root of the number of groups associated with the targeting criteria and including the user and a fourth root of the number of groups including the user incremented by the target group. Hence, the score associated with a user provides a measure of the difficulty or ease with which the online system 140 identifies content eligible for presentation to a user.

The online system 140 determines 320 a group score associated with the target group based at least in part on the scores determined 315 for each of a plurality of users identified as included in the target group. For example, the online system 140 determines 320 a group score based on scores associated with a set of the identified users; as another example, the online system 140 determines 320 the group score based on scores associated with each identified user. In one embodiment, the group score is determined 320 based on an average of the scores associated with a plurality of the users identified 310 as included in the target group. For example, the group score is a square root of a product of the total of the scores associated with the identified users and the average of the scores associated with the identified users. In the preceding example, the group score is higher if the target group includes a large number of users or if the target group increases the ability of the online system 140 to target content items to users included in the target group. For example, if the target group allows the online system 140 to identify a group of users for receiving content items that is not able to be readily identified by targeting criteria maintained by the online system 140.

Based on the group score, the online system 140 determines 325 whether to store the information describing the target group. In one embodiment, the online system 140 stores the information describing the target group if the group score equals or exceeds a threshold value. If the group score is less than the threshold value, the online system 140 discards the information describing the target group. However, in other embodiments, the online system 140 may determine 315 whether to store the information describing the target group based on whether the group score satisfies one or more suitable criteria. Limiting storage of information describing target groups to target groups having at least a threshold target score allows the online system 140 to store information from the third party system 130 describing a target group that allows the online system 140 to more accurately target content items to different users or to identify a group of users not otherwise identified by targeting criteria maintained by the online system 130.

If the information describing the target group is stored, the online system 140 may subsequently use the target group to identify content items for presentation. For example, content items may include targeting criteria identifying the target group so the content items are eligible for presentation to users included in the target group but not eligible for presentation to users not included in the target group. Over time, the online system 140 may determine whether to continue to store the information describing the target group based on presentation of content items identifying the target group as targeting criteria.

For example, if the online system 140 receives compensation for presenting content items to users included in the target group (e.g., advertisements specifying inclusion in the target group in targeting criteria), the online system 140 determines whether to maintain storage of the information describing the target group based on a monetization value determined from an amount of revenue received by the online system 140 from content items presented to users in the target group. For example, the online system 140 determines whether the average revenue received by the online system 140 over a time interval for presenting content items to users based on the users' inclusion in the target group is at least a threshold amount and removes the information describing the target group if the average revenue is less than the threshold amount. As another example, the online system 140 determines the monetization value based on one or more of: a total revenue to the online system 140 for presenting content to users in the target group during a time interval, an average revenue to the online system 140 for presenting content to users in the target group over the time interval, a total number of content items associated with targeting criteria specifying inclusion in the target group presented to users in the target group during the time interval, and an average number of content items associated with targeting criteria specifying inclusion in the target group presented to users in the target group during the time interval. The online system 140 may determine the monetization value as a square root of a product of an average revenue to the online system 140 for presenting content to users in the target group over the time interval, a total number of content items associated with targeting criteria specifying inclusion in the target group presented to users in the target group during the time interval, and an average number of content items associated with targeting criteria specifying inclusion in the target group presented to users in the target group during the time interval. If the monetization value equals or exceeds a threshold amount, the online system 140 continues to store information describing the target group; however, if the monetization value is less than the threshold amount, the online system 140 discards the information describing the target group.

The online system 140 may determine an accuracy score associated with the target group and uses the accuracy score to determine whether to continue storing information describing the target group. For example, the online system 140 communicates one or more questions (e.g., surveys) to client devices 110 associated with users included in the target group to determine whether users included in the target group indicate they have characteristics associated with the target group. The one or more questions may be communicated to the client devices 110 before the online system 140 uses the target group to select content. In one embodiment, higher accuracy scores indicate that users in the target group indicate via responses to the one or more questions that they have characteristics associated with the target group. If the accuracy score is less than a threshold value, the online system 140 removes the information describing the target group.

The online system 140 may periodically determine the monetization score associated with a target group to determine whether to continue storing the information describing the target group. Alternatively, the online system 140 determines the monetization score associated with the target group when a content item identifying inclusion in the target group as targeting criteria is presented to one or more users included in the target group. Determining a monetization score associated with the target group allows the online system 140 to maintain information describing target groups providing at least a threshold amount of revenue to the online system 140 while discarding information describing target groups that do not provide sufficient revenue to the online system 140. Similarly, determining an accuracy score associated with the target group allows the online system 140 to maintain information describing target groups having at least a threshold accuracy in identifying characteristics of users included in the target groups.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A method comprising:
    maintaining, at an online system, a plurality of target groups of users of the online system, each target group being defined by user characteristics satisfying one or more targeting criteria for the target group, each target group including a plurality of users of the online system;
    periodically determining a group score for each target group that corresponds to a value of the online system maintaining the target group, the group score for each target group being determined by:
        identifying each of the plurality of users of the online system included in the target group;
        identifying, from information maintained by the online system for each user of the plurality of users included in the target group, one or more targeting criteria used by the online system to select content for each user included in the target group;
        determining a user score for each of a plurality of the users included in the target group, the user score being determined as a function of a number of the plurality of target groups maintained by the online system in which the user is already included based on the user characteristics for the user satisfying one or more of the targeting criteria for the number of the plurality of target groups, the user score for a user providing a measure of value in having the user be included in the target group based on targeting criteria associated with the user, the user score being inversely related to the number of the plurality of target groups in which the user is included;
        aggregating the determined user scores for each of the plurality of the users included in the target group to determine the group score;
    responsive to the group score for the target group being greater than at least a threshold value, continue storing, by the online system, the information describing the target group in the memory of the online system; and
    responsive to the group score for the target group being less than the threshold value, removing the information describing the target group from the memory of the online system.

2. The method of claim 1, wherein determining the group score associated with the target group based on the aggregate of the determined scores comprises:
    determining an average of the determined user scores; and
    determining the group score based at least in part on the determined average of the determined user scores.

3. The method of claim 2, wherein determining the group score based at least in part on the determined average of the determined user scores comprises:
    determining a sum of the determined user scores; and
    determining the group score based at least in part on the determined average of the determined user scores and the determined sum of the determined user scores.

4. The method of claim 3, wherein determining the group score based at least in part on the determined average of the determined user scores and the determined sum of the determined user scores comprises:

determining the group score as a square root of a product of the determined average of the determined user scores and the determined sum of the determined user scores.

5. The method of claim 1, further comprising:
selecting content for presentation a user of the online system based at least in part on whether the user is included in the target group; and
determining a monetization value associated with the target group, the monetization value based at least in part on an amount of revenue to the online system from presenting content items identifying users in the target group as eligible to be presented with the content items, wherein removing the target group from the memory of the online system responsive to the group score for the target group being less than the threshold value further includes the amount of revenue being less than a threshold amount.

6. The method of claim 5, wherein the monetization value is determined based at least in part on one or more selected from a group consisting of: a total revenue to the online system during a time interval from presenting content items identifying users in the target group as eligible to be presented with the content items, an average revenue to the online system during a time interval from presenting content items identifying users in the target group as eligible to be presented with the content items, a total number of content items identifying users in the target group as eligible to be presented with the content items presented to users in the target group during the time interval, an average number of content items identifying users in the target group as eligible to be presented with the content items presented to a user in the target group during the time interval, and any combination thereof.

7. The method of claim 5, wherein determining the monetization value associated with the target group comprises:
determining a total revenue to the online system during a time interval from presenting content items identifying users in the target group as eligible to be presented with the content items;
determining an average revenue to the online system during a time interval from presenting content items identifying users in the target group as eligible to be presented with the content items;
determining a total number of content items identifying users in the target group as eligible to be presented with the content items presented to users in the target user during the time interval;
determining an average number of content items identifying users in the target group as eligible to be presented with the content items presented to a user in the target user during the time interval, and
determining the monetization value as a product of the total revenue during the time interval, the average revenue during the time interval, the total number of content items, and the average number of content items.

8. A computer program product comprising a computer readable storage medium having instructions encoded thereon that, when executed by a processor, cause the processor to:
maintain, at an online system, a plurality of target groups of users of the online system, each target group being defined by user characteristics satisfying one or more targeting criteria for the target group, each target group including a plurality of users of the online system;
periodically determine a group score for each target group that corresponds to a value of the online system maintaining the target group, the group score for each target group being determined by:
identify each of the plurality of users of the online system included in the target group;
identify, from information maintained by the online system for each user of the plurality of users included in the target group, one or more targeting criteria used by the online system to select content for each user included in the new target group;
determine a user score for each of a plurality of the users included in the target group, the user score being determined as a function of a number of the plurality of target groups maintained by the online system in which the user is already included based on the user characteristics for the user satisfying one or more of the targeting criteria for the number of the plurality of target groups, the user score for a user providing a measure of value in having the user be included in the target group based on targeting criteria associated with the user, the user score being inversely related to the number of the plurality of target groups in which the user is included;
aggregate the determined user scores for each of the plurality of the users included in the target group to determine the group score;
responsive to the group score for the target group being greater than at least a threshold value, continue to store, by the online system, the information describing the target group in the memory of the online system; and
responsive to the group score for the target group being less than the threshold value, remove the information describing the target group from the memory of the online system.

9. The computer program product of claim 8, wherein determine the group score associated with the target group based on the aggregate of the determined scores comprises:
determine an average of the determined user scores; and
determine the group score based at least in part on the determined average of the determined user scores.

10. The computer program product of claim 9, wherein determine the group score based at least in part on the determined average of the determined user scores comprises:
determine a sum of the determined user scores; and
determine the group score based at least in part on the determined average of the determined user scores and the determined sum of the determined user scores.

11. The computer program product of claim 8, wherein the computer readable storage medium further has encoded thereon instructions, that when executed by the processor, cause the processor to:
select content for presentation a user of the online system based at least in part on whether the user is included in the target group;
determine a monetization value associated with the target group, the monetization value based at least in part an amount of revenue to the online system from presenting content items identifying users in the additional target group as eligible to be presented with the content items, wherein removing the target group from the memory of the online system responsive to the group score for the target group being less than the threshold value further includes the amount of revenue being less than a threshold amount.

12. The computer program product of claim 11, wherein the monetization value is determined based at least in part on one or more selected from a group consisting of: a total revenue to the online system during a time interval from presenting content items identifying users in the target group as eligible to be presented with the content items, an average revenue to the online system during a time interval from presenting content items identifying users in the target group as eligible to be presented with the content items, a total number of content items identifying users in the target group as eligible to be presented with the content items presented to users in the target group during the time interval, an average number of content items identifying users in the target group as eligible to be presented with the content items presented to a user in the target group during the time interval, and any combination thereof.

13. A system, comprising:
   a processor;
   a non-transitory memory including instructions, which when executed by the processor cause the processor to perform steps of:
   maintaining, at an online system, a plurality of target groups of users of the online system, each target group being defined by user characteristics satisfying one or more targeting criteria for the target group, each target group including a plurality of users of the online system;
   periodically determining a group score for each target group that corresponds to a value of the online system maintaining the target group, the group score for each target group being determined by:
      identifying each of the plurality of users of the online system included in the target group;
      identifying, from information maintained by the online system for each user of the plurality of users included in the target group, one or more targeting criteria used by the online system to select content for each user included in the target group;
      determining a user score for each of a plurality of the users included in the target group, the user score being determined as a function of a number of the plurality of target groups maintained by the online system in which the user is already included based on the user characteristics for the user satisfying one or more of the targeting criteria for the number of the plurality of target groups, the user score for a user providing a measure of value in having the user be included in the target group based on targeting criteria associated with the user, the user score being inversely related to the number of the plurality of target groups in which the user is included;
      aggregating the determined user scores for each of the plurality of the users included in the target group to determine the group score;
   responsive to the group score for the target group being greater than at least a threshold value, continue storing, by the online system, the information describing the target group in the memory of the online system; and
   responsive to the group score for the target group being less than the threshold value, removing the information describing the target group from the memory of the online system.

14. The method of claim 1, wherein determining the score for the user that provides the measure of value in having the user be included in the target group maintained by the online system is based on the targeting criteria associated with the user further comprises:
   determining a number of target groups to which the user belongs, each target group being associated with targeting criteria describing the target group;
   determining a value based on the determined number of target groups to which the user belongs; and
   determining an additional value based on an additional number of target groups to which the user belongs, the additional number of target groups determined by incrementing the determined number of groups by the target group.

15. The computer program product of claim 8, wherein determining the score for the user that provides the measure of value in having the user be included in the target group maintained by the online system is based on the targeting criteria associated with the user further comprises:
   determining a number of target groups to which the user belongs, each target group being associated with targeting criteria describing the target group;
   determining a value based on the determined number of target groups to which the user belongs; and
   determining an additional value based on an additional number of target groups to which the user belongs, the additional number of target groups determined by incrementing the determined number of groups by the target group.

\* \* \* \* \*